United States Patent
Ramey (10) Patent No.: US 7,552,241 B2
(45) Date of Patent: Jun. 23, 2009

(54) METHOD AND SYSTEM FOR MANAGING A PLURALITY OF I/O INTERFACES WITH AN ARRAY OF MULTICORE PROCESSOR RESOURCES IN A SEMICONDUCTOR CHIP

(75) Inventor: Carl Ramey, Westborough, MA (US)

(73) Assignee: Tilera Corporation, Westborough, MA (US)

( * ) Notice: Subject to any disclaimer, the term of this patent is extended or adjusted under 35 U.S.C. 154(b) by 0 days.

(21) Appl. No.: 11/804,551

(22) Filed: May 18, 2007

(65) Prior Publication Data

US 2008/0288683 A1    Nov. 20, 2008

(51) Int. Cl.
    *G06F 3/00*    (2006.01)
(52) U.S. Cl. ......................................................... 710/1
(58) Field of Classification Search ...................... 710/1, 710/22
    See application file for complete search history.

(56) References Cited

U.S. PATENT DOCUMENTS

| | | | |
|---|---|---|---|
| 4,156,798 A * | 5/1979 | Doelz | 700/4 |
| 6,101,599 A * | 8/2000 | Wright et al. | 712/228 |
| 2007/0067432 A1 * | 3/2007 | Tarui et al. | 709/223 |
| 2007/0143395 A1 * | 6/2007 | Uehara et al. | 709/203 |
| 2007/0271372 A1 * | 11/2007 | Deninger et al. | 709/224 |

OTHER PUBLICATIONS

Definition of 'QOS' from www.xreferplus.com, 1999, John Wiley & Sons Ltd.*

* cited by examiner

*Primary Examiner*—Henry W. H. Tsai
*Assistant Examiner*—Hyun Nam (57) ABSTRACT

The present invention relates to a method and system for managing I/O interfaces with an array of multicore processor resources in a semiconductor chip. The I/O interfaces are connected to the processor resources through an I/O shim. An I/O interface sends a dataframe to the I/O shim. The I/O interface packetizes data to form the dataframe, based on an I/O protocol. The dataframe includes a header and the data. The I/O shim identifies a command corresponding to the dataframe by using one or more of the processor resources. The command includes a set of tasks. Subsequently, the set of tasks is executed on the data.

20 Claims, 9 Drawing Sheets

METHOD AND SYSTEM FOR MANAGING A PLURALITY OF I/O INTERFACES WITH AN ARRAY OF MULTICORE PROCESSOR RESOURCES IN A SEMICONDUCTOR CHIP

BACKGROUND OF THE INVENTION

The present invention relates, in general, to interfacing Input/Output (I/O) interfaces with an array of multicore processor resources that are connected in a tiled architecture. In particular, the present invention relates to providing a dynamic software-controlled hardware interface between the I/O interfaces and the array of multicore processor resources.

I/O interfaces are hardware circuits that are designed to process, initialize and move data in a semiconductor chip. Examples of I/O interfaces include a 10 Gbe, a PCIe, Gbe I/Os, and the like. The hardware circuitry of an I/O interface depends on its usage model and application. For example, some applications require transfer of the data prior to processing it, while other applications require processing of the data prior to its transfer. The I/O interfaces are connected to the processor resources. The processor resources processes the data received from the I/O interfaces. The I/O interfaces are generally connected to the processor resources by hard-wired connections that are designed based on a predefined addressing scheme. Examples of predefined addressing schemes include a memory-mapped addressing scheme and an I/O-mapped addressing scheme. The I/O interface connections do not facilitate the flexibility of dynamically connecting the I/O interfaces with the processor resources.

The hardware circuitry is designed by using common buses, such that a particular I/O interface can only communicate with its corresponding processor resource. This adds to the complexity of the circuit, particularly if the number of I/O interfaces and/or processor resources is large. Consequently, the circuitry requires additional chip area, and each processor resource is rigidly pre-assigned to an I/O resource. Moreover, the combination of a particular processor resource and its corresponding I/O interface is also fixed.

Alternatively, tri-state bus architecture can be used in the hardware circuitry. The tri-state bus architecture allows a limited number of processor resources to be dynamically linked to the I/O interfaces. The limit of the number of processor resources linked to I/O interfaces is based on the electrical characteristics, such as current requirements, acceptable transfer delays, and the like. Additionally, the tri-state bus architecture has to ensure no contention on tri-state buses during every scan shift operation in Automatic Test Pattern Generating Concerns (ATAG). ATAG is used to distinguish between the correct circuit behavior and the faulty circuit behaviors caused by any fault in the design or performance of the circuit.

In light of the foregoing discussion, there is a need for a method and system for dynamically managing I/O interfaces with an array of multicore processor resources. Such a method and system should provide a dynamically controlled hardware circuit to connect I/O interfaces to the array of multicore processor resources that use the chip area efficiently. This would eliminate any predetermined binding of a particular processor resource with a corresponding I/O interface. Further, such a system should be scalable, so that one or more of the processor resources can be connected to an I/O interface, depending on its characteristics. Furthermore, such a system should facilitate the assignment of processor resources to the I/O interfaces in any desired combination.

SUMMARY OF THE INVENTION

An object of the present invention is to provide a method and system for managing Input/Output (I/O) interfaces with an array of multicore processor resources in a semiconductor chip.

Another object of the present invention is to provide a dynamic interface I/O shim between the array of multicore processor resources and the I/O interfaces, with a chip area-efficient hardware controlled by software. This provides flexibility to the process of dynamically assigning one or more of the processor resources to each of the I/O interfaces to process data.

Yet another object of the present invention is to eliminate the pre-determined assignment of the processor resources to any of the I/O interfaces. This provides flexibility in using the processor resources.

Yet another object of the present invention is to dynamically identify the number of processor resources needed for an I/O interface, depending on the characteristics of the I/O interface.

Yet another object of the present invention is to provide an I/O shim's software control that strings together the processor resources and the I/O interfaces in any desired combination.

Various embodiments of the present invention provide a method and system for managing I/O interfaces with an array of multicore processor resources in a semiconductor chip. Such a system for managing I/O interfaces with an array of multicore processor resources is hereinafter referred as an I/O shim. An I/O interface sends a dataframe to the I/O shim. This dataframe is formed by packetizing data based on an I/O protocol. The dataframe includes the data and a header. The I/O shim identifies a command corresponding to the dataframe by using one or more of the processor resources. The command includes a set of tasks, which is executed on the data by the I/O shim.

BRIEF DESCRIPTION OF THE DRAWINGS

Embodiments of the present invention will hereinafter be described in conjunction with the appended drawings that are provided to illustrate and not to limit the present invention, wherein like designations denote like elements, and in which.

DETAILED DESCRIPTION OF THE INVENTION

Various embodiments of the present invention provide a method, system and computer program product for managing Input/Output (I/O) interfaces with an array of multicore processor resources in a semiconductor chip. Such a system for managing I/O interfaces with an array of multicore processor resources is hereinafter referred to as an I/O shim. Examples of the I/O interfaces include a 10 Gbe, a PCIe, Gbe I/Os, and the like. The I/O interfaces use different I/O protocols to communicate with the array of multicore processor resources to process data. Examples of such I/O protocols include, but are not limited to, a Local Interconnect Network (LIN) protocol, a Controller Area Network (CAN) protocol, a Media Oriented System Transport (MOST) protocol, and a Transmission Control Protocol/Internet Protocol (TCP/IP).

These I/O interfaces communicate with the array of multicore processor resources through I/O Dynamic Network (IODN) lines. However, the I/O interfaces communicate with the memory used for storing data through Memory Dynamic Network (MDN) lines. The I/O interfaces transmit the data that is packetized in dataframes to a desired location, depending on the task to be executed on the data. These dataframes are formed by the I/O interfaces based on the set of rules defined by an I/O protocol. Different I/O interfaces use different I/O protocols to form the dataframes by packetizing the data. Further, the location of the header and the data included in each dataframe is defined on the basis of the I/O protocol used to form the dataframe.

The header in the dataframe includes a command which is detected by a processor resource. This processor resource is selected from the array of multicore processor resources on the basis of its availability and capability. The capability of a processor resource is defined as the set of tasks that can be executed by the processor resource. Each processor resource in the array of multicore processor resources is programmed to execute a certain set of tasks on the data. This set of tasks is included in a command. Further, the identification of the command corresponding to the header in the dataframe is executed by a processor resource that is chosen randomly from a set of available and capable processor resources. These processor resources are a part of the array of multicore processor resources. Subsequently, the set of tasks present in the command is executed on the data.

Figure 1:
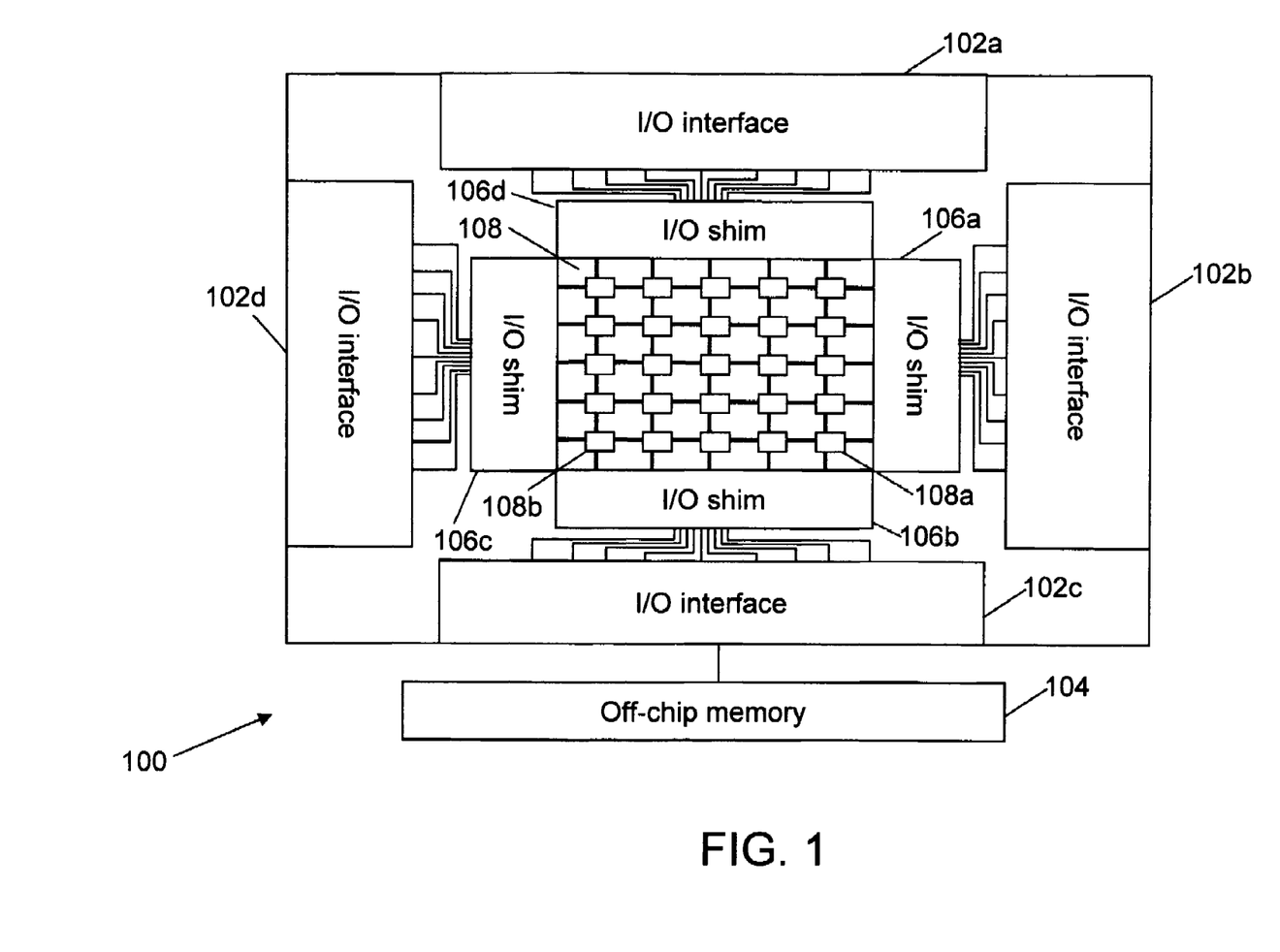
FIG. 1 is a block diagram illustrating a semiconductor chip, wherein various embodiments of the present invention can be practiced.

FIG. 1 is a block diagram illustrating a semiconductor chip 100, wherein various embodiments of the present invention can be practiced. Semiconductor chip 100 includes I/O interfaces 102*a-d*, an off-chip memory 104, I/O shims 106*a-d*, and an array of multicore processor resources 108. I/O interfaces 102*a-d* form the hardware circuitry that provides compatibility for communication between processing units interconnected through these I/O interfaces. I/O interfaces 102*a-d* use different I/O protocols to packetize data and are designed differently for different I/O protocols. In accordance with an embodiment of the present invention, I/O interfaces 102*a-d* may use similar protocols for packetizing the data. Based on the I/O protocol, each of I/O interfaces 102*a-d* packetizes data to form a dataframe and uses the dataframe to transfer the data to a desired location.

Off-chip memory 104 is connected to semiconductor chip 100 to store the data. I/O shims 106*a-d* are interfaces between I/O interfaces 102*a-d* and an array of multicore processor resources 108. I/O shims 106*a-d* are designed logic with a hardware component and a software component. I/O shims 106*a-d* process the data and manage the processed data in order to move the data to a desired location. Thus, I/O shims 106*a-d* dynamically interface each of I/O interfaces 102*a-d* to the array of multicore processor resources 108.

In addition, I/O shims 106*a-d* provide compatibility between I/O interfaces 102*a-d* and the array of multicore processor resources 108. This compatibility includes understanding I/O protocols and the usage models of I/O interfaces 102, and the like, by the array of multicore processor resources 108. The usage model of I/O interfaces 102*a-d* can be any of transferring data application, processing data to format dataframes, and the like.

The array of multicore processor resources 108 includes processor resources arranged in a tiled manner in semiconductor chip 100. Each processor resource in the array of multicore processor resources 108 executes a specified set of tasks and can be dynamically programmed to execute the required set of tasks. This is achieved by programming the array of multicore processor resources 108 to execute a defined set of tasks in semiconductor chip 100 at any point of time. Since processor resources present in the array of multicore processor resources 108 are reprogrammed dynamically, depending on the requirement and availability of processor resources, the defined set of tasks keeps changing for particular processor resources. Further, each processor resource in the array of multicore processor resources 108 can program I/O shims 106*a-d*, to execute a set of tasks on the data. In accordance with another embodiment of the present invention, I/O shims 106*a-d* can be programmed by an off-chip controller 218 that is connected to semiconductor chip 100.

Figure 2:
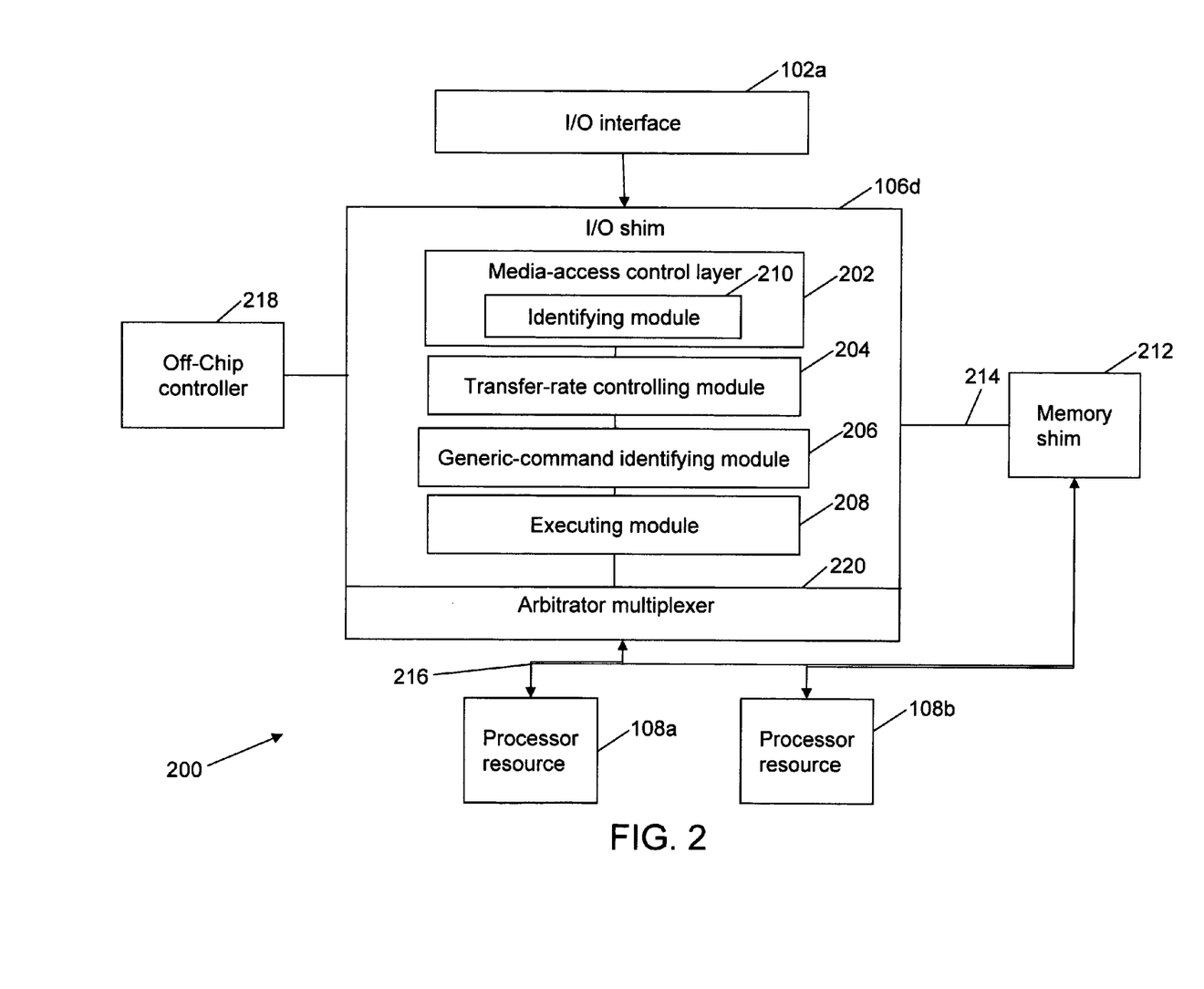
FIG. 2 is a block diagram illustrating a system for managing Input/Output (I/O) interfaces with an array of multicore processor resources present in the semiconductor chip in accordance with an embodiment of the present invention.

FIG. 2 is a block diagram illustrating a system 200 for managing Input/Output (I/O) interfaces 102*a-d* with the array of multicore processor resources 108 present in semiconductor chip 100, in accordance with an embodiment of the present invention. System 200 includes I/O interface 102*a*, I/O shim 106*d*, along with its elements, processor resources 108*a* and 108*b*, a memory shim 212, and an off-chip controller 218. I/O interface 102*a* communicates with the array of multicore processor resources 108 through I/O shim 106*d*, using IODN lines 216. However, for the purpose of illustration, only two multicore processor resources, 108*a* and 108*b*, are shown in FIG. 2. I/O interface 102*a* can communicate with one or more processor resources in the array of multicore processor resources 108, depending on the characteristics and requirement of I/O interface 102*a*. I/O interface 102*a* packetizes data to form a dataframe, based on a corresponding I/O protocol. The dataframe includes a header and a data bit portion. I/O interface 102*a* sends the dataframe to I/O shim 106*d*.

I/O shim 106*d* dynamically interfaces I/O interface 102*a* and the array of multicore processor resources 108, using a designed combination of hardware and software components. The software components of I/O shim 106*d* are stored in configuration registers of I/O shim 106*d*. I/O shim 106*d* can be dynamically programmed at any instant by writing a program code in the configuration registers. I/O shim 106*d* can be programmed by one of the processor resources in the array of multicore processor resources 108 or by off-chip controller 218 connected to I/O shim 106a-d in semiconductor chip 100. Since I/O shim 106d is a hardware component that is controlled by a software component, it can handle multiple I/O usage models. For example, I/O shim 106d can handle the tasks of sending the received data directly to memory shim 212 or to processor resource 108a or 108b, depending on the requirement, as well as sending the received data directly from I/O interface 102a to I/O interface 102b via one of I/O shim 106a-d and one of the array of multicore processor recourses 108.

I/O shim 106d includes a media-access control layer 202, a transfer-rate controlling module 204, a generic-command identifying module 206, an executing module 208, and an arbitrator multiplexer 220. Each of I/O interfaces 102 has a corresponding compatible media-access control layer. For example, I/O interface 102a has a specifically designed corresponding control layer compatible with media-access control layer 202. The dataframe received from I/O interface 102a is routed to its corresponding media-access control layer 202, which includes an identifying module 210. Identifying module 210 identifies the I/O protocol used in the dataframe received from I/O interface 102a. Further, media-access control layer 202 identifies the header and the data present in the dataframe by using the identified I/O protocol. Additionally, media-access control layer 202 may be configured in a pass-all-packet mode in order to make media-access control layer 202 compatible with custom packets. These custom packets are generated by non-standard I/O interfaces. For custom packets, media-access control layer 202, configured in pass-all-packet mode, bypasses traditional MAC (Media Access Control) features such as CRC (Cyclical Redundancy Code) checking, preamble processing, framing, and L2 header checking. These bypassed features are performed by processor resources 108. Further, processing of the custom packet information is also performed by processor resources 108.

Transfer-rate controlling module 204 regulates the rate at which the dataframe is received. Transfer-rate controlling module 204 connects media-access control layer 202 with generic-command identifying module 206. Transfer-rate controlling module 204 also dynamically connects the complex pieces of design in generic-command identifying module 206 with media-access control layer 202. This results in the complex pieces of designs in generic-command identifying module 206 being dynamically used for different media-access control layers. The complex pieces of design in generic-command identifying module 206 includes the designs of a Direct Media Access (DMA) engine, a configuration interface, a network interface, a First-In-First-Out (FIFO), and interrupt generation.

Generic-command identifying module 206 provides flexibility to handle any protocol-specific data from I/O interfaces 102. In addition, generic-command identifying module 206 dynamically manipulates the header present in the dataframe, e.g., pre-pending data or post-pending data, based on the computational requirement. Thereby, generic-command identifying module 206 provides capabilities of load balancing, protocol sorting, simple quality of service (QoS), and header forwarding to I/O shim 106.

Generic-command identifying module 206, with the help of processor resources, identifies the command present in the header of the dataframe and takes dynamic decisions, based on the identified command. This includes pre-pending and post-pending the data. In addition, generic-command identifying module 206 is defined to provide a message-based protocol to I/O interface 102a for communication. This eliminates the need for I/O protocol-specific hardware in semiconductor chip 100, since a message-based protocol provides the ability to emulate. This emulation is performed based on the data information, which is in the form of bits in the message. The active bits have emulating signals. Further, the message-based protocol virtualizes a required set of tasks such that each of the set of tasks can be represented by a message. After receiving the message, the set of tasks is performed so the message virtually represents the set of tasks. This includes virtualizing tasks such as interrupt generation, interrupt handling, as well as register and processor commands.

Furthermore, the message-based protocol can also be coupled with the array of multicore processor resources 108 that are arranged in a tiled fashion. Moreover, the message-based protocol provides flexibility in the assignment of either a processor resource 108a or a processor resource 108b to I/O interface 102a. For example, if processor resource 108a wants to shift control of I/O interface 102a to processor resource 108b, processor resource 108a sends a message-based protocol message to processor resource 108b to indicate the shift of control. This provides I/O management of I/O interfaces 102 present in the array of multicore processor resources 108. In addition, this provides dynamic assignment of processor resource 108a or 108b to I/O interfaces 102. As a result, pre-determined binding of processor resource 108a to service I/O interfaces 102 is eliminated. Examples of such services include, but are not limited to, controlling ingress and egress traffic, headerframe processing, power management, initialization, interrupts, and Basic Input/Output System (BIOS)-level interactions.

Executing module 208 stores the data in memory shim 212 through MDN lines 214. Subsequently, executing module 208 executes the set of tasks corresponding to the command identified on the dataframe, using one or more processor resources from the array of multicore processor resources 108. Each processor resource in the array of multicore processor resources 108 is a processing unit that is programmed to execute a set of tasks on the received data. Each of the processor resources in the array of multicore processor resources 108 is connected to I/O shim 106d through IODN lines 216. I/O shim 106d transfers the data to one of the array of multicore processor resources 108 on IODN lines 216. Further, each processor resource in the array of multicore processor resources 108 can program I/O shim 106d to execute a set of tasks on the data.

Figure 3:
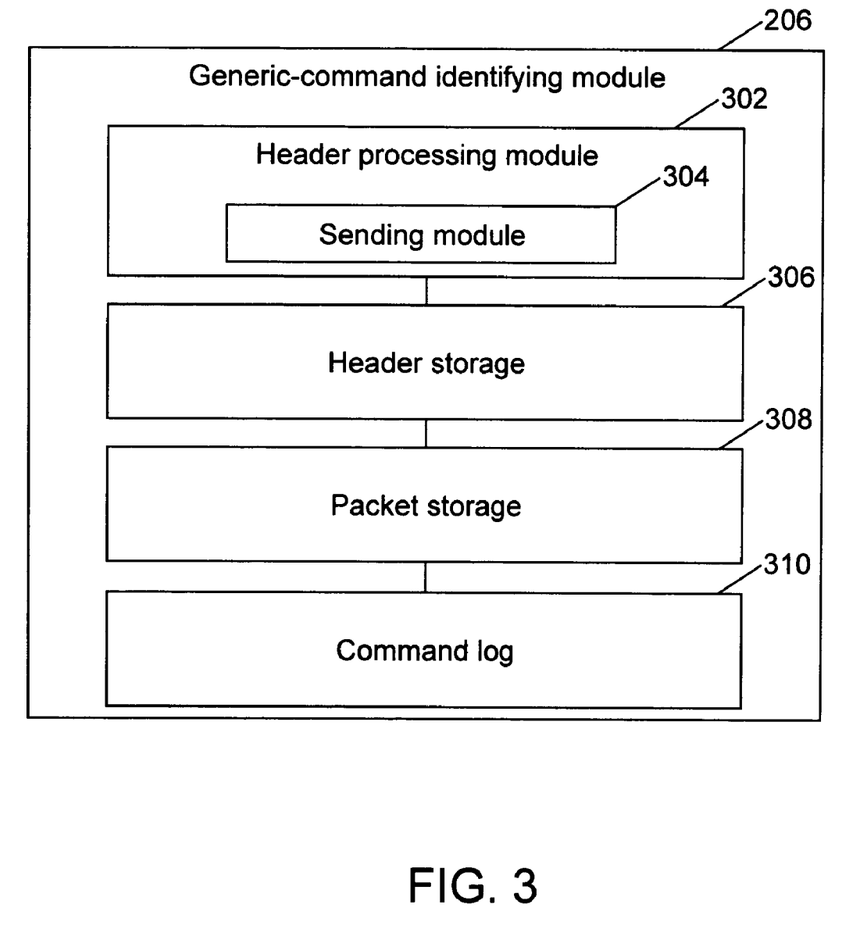
FIG. 3 is a block diagram illustrating a generic-command identifying module, along with its elements, in accordance with an embodiment of the present invention.

FIG. 3 is a block diagram illustrating generic-command identifying module 206, along with its elements, in accordance with an embodiment of the present invention. Generic-command identifying module 206 includes a header-processing module 302, a header storage 306, a packet storage 308, and a command log 310. Header-processing module 302 extracts the header and the data from the dataframe received from I/O interfaces 102. The header in the dataframe may include a Quality of Service (QoS) indicator. The header includes information pertaining to the data structure and the location of the header. The data structure of header storage 306 and packet storage 308 can be one of Last In First Out (LIFO), First In First Out (FIFO), or a tree structure.

Header-processing module 302 stores the header in header storage 306 by using the corresponding data structure information pertaining to the header as known to a person ordinarily skilled in the art. The header and the data are defined by a configuration register. Further, header-processing module 302 stores the data in packet storage 308 by using the corresponding data structure information relating to the data. Header storage 306 and packet storage 308 are memory units for storing the header and the data, respectively. These memory units follow a predefined data structure.

Header-processing module 302 packetizes the header to form a headerframe. The headerframe includes the address of a processor resource that is selected from the array of multicore processor resources 108. This processor resource is dynamically selected from the array of multicore processor resources 108 and is capable of and available for executing a required set of tasks. Header-processing module 302 includes a sending module 304, which sends the headerframe to the selected processor resource. The headerframe is routed to the selected processor by arbitrator multiplexer 220. This selected processor resource checks for framing errors in the headerframe and sends back the acknowledge command. The checking of framing errors includes checking parity of the header frame, cyclic redundancy code (CRC) of the header frame and the like, in order to check and remove errors in the received headerframe. Subsequently, the selected processor resource identifies the command corresponding to the headerframe. The processor resource, based on the identified command, issues a directive command to command log 310. Command log 310 includes a set of tasks corresponding to each of the received directive commands. Subsequently, the set of tasks corresponding to the received directive command is executed on the data by one of the processor resources or I/O shim 106 based on the set of tasks to be performed. The directive command also includes information about packetizing the header to form the headerframe in order to execute the set of tasks.

Figure 4:
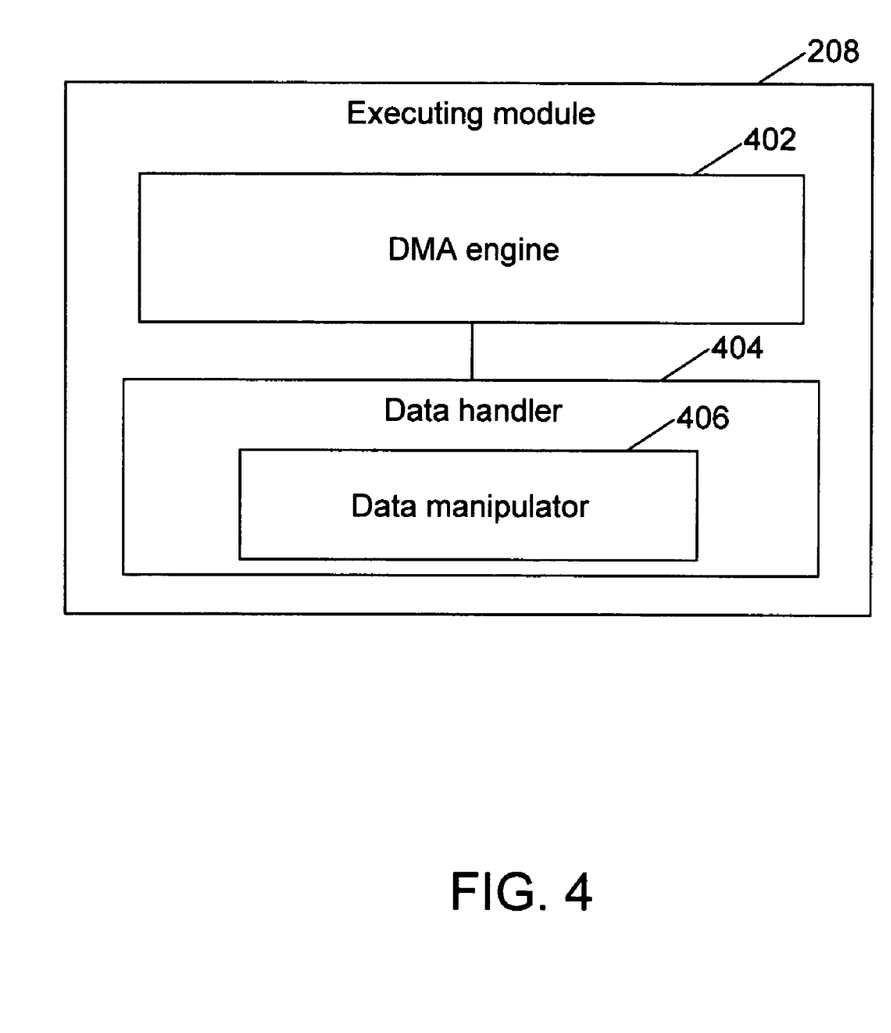
FIG. 4 is a block diagram illustrating an executing module, along with its elements, in accordance with an embodiment of the present invention.

FIG. 4 is a block diagram illustrating executing module 208, along with its elements, in accordance with an embodiment of the present invention. Executing module 208 includes a Direct memory access (DMA) engine 402 and a data handler 404. DMA engine 402 is a programmable unit, which can be programmed by one of the array of multicore processor resources 108, based on the command identified in the headerframe. In accordance with another embodiment, DMA engine 402 can be programmed based on a set of tasks that DMA engine 402 is required to perform on the data. DMA engine 402 transfers the data to a desired location, based on the requirement identified in the command, from I/O shim 106 to memory shim 212 through MDN lines 214. Alternatively, DMA engine 402 transfers the data from I/O shim 106 to one of the array of multicore processor resources 108 through IODN lines 216. Data handler 404 performs protocol-specific processing to manipulate data, based on the identified command. Data handler 404 includes a data manipulator 406, which performs specific data manipulation, based on the identified command. For example, data manipulator performs the functions of pre-pending or post-pending the data, and the like.

Figure 5:
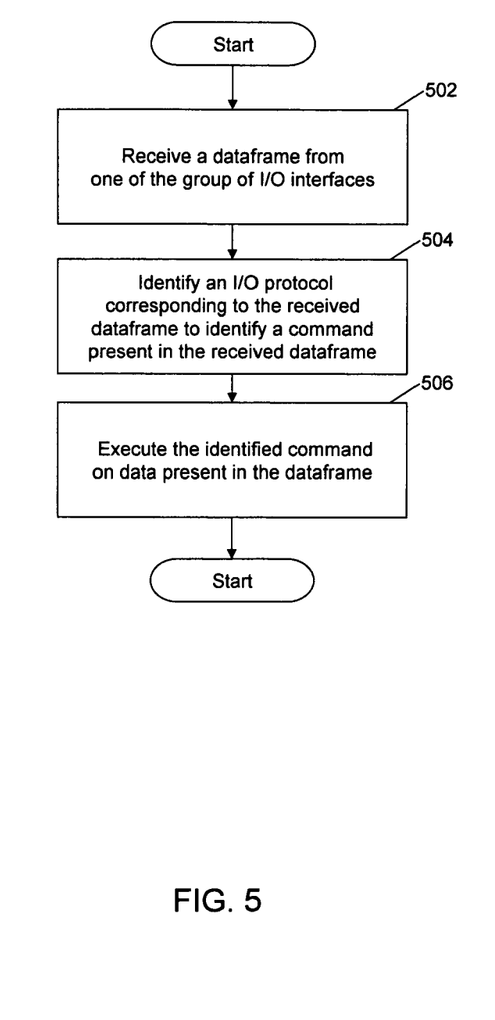
FIG. 5 illustrates a flow diagram of a method for managing the I/O interfaces with the array of multicore processor resources in the semiconductor chip in accordance with an embodiment of the present invention.

FIG. 5 is a flow diagram illustrating a method for managing I/O interfaces 102 with the array of multicore processor resources 108 in semiconductor chip 100, in accordance with an embodiment of the present invention. I/O interface 102*a* packetizes data, based on an I/O protocol, to form a dataframe. The dataframe includes a header and a data portion. At step 502, the dataframe is received from I/O interface 102*a* at I/O shim 106*d*. At step 504, the I/O protocol corresponding to the dataframe is identified by identifying module 210 present in I/O shim 106*d*. The header is identified by I/O shim 106*d* in the dataframe by using the identified I/O protocol information. This I/O protocol information provides I/O shim 106*d* with information regarding the header and data portion of the dataframe. Further, a command, corresponding to the identified header, is detected by processor resource 108*a*. Processor resource 108*a* is selected from the array of multicore processor resources 108, based on the capabilities and availability of multicore processor resources. The detected command includes a set of tasks that are to be executed on the data. At step 506, the set of tasks is executed on the data present in the dataframe by one of the processor resources or I/O shim 106*d* based on the set of tasks to be performed.

Figure 6A:
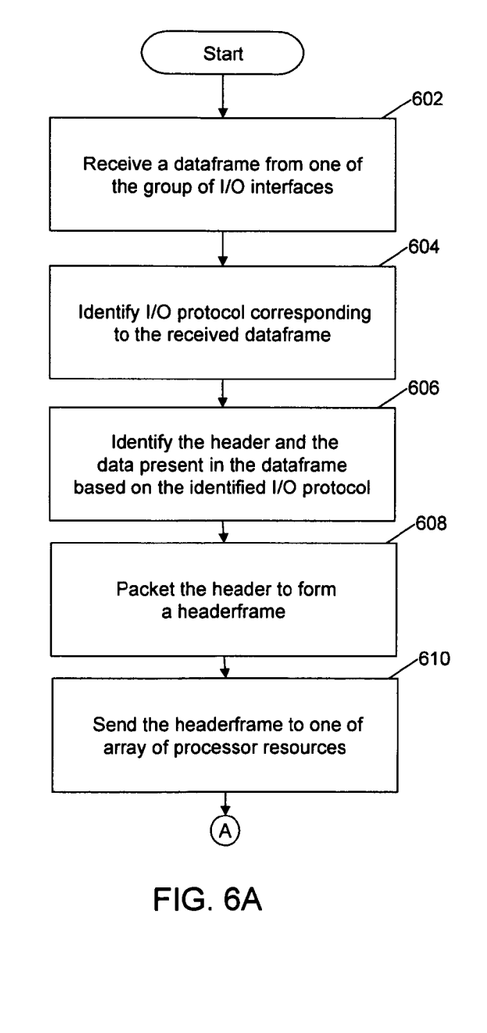
FIGS. 6A and 6B illustrate a flow diagram of a method for managing the I/O interfaces with the array of multicore processor resources in the semiconductor chip in accordance with a detailed embodiment of the present invention.
Figure 6B:
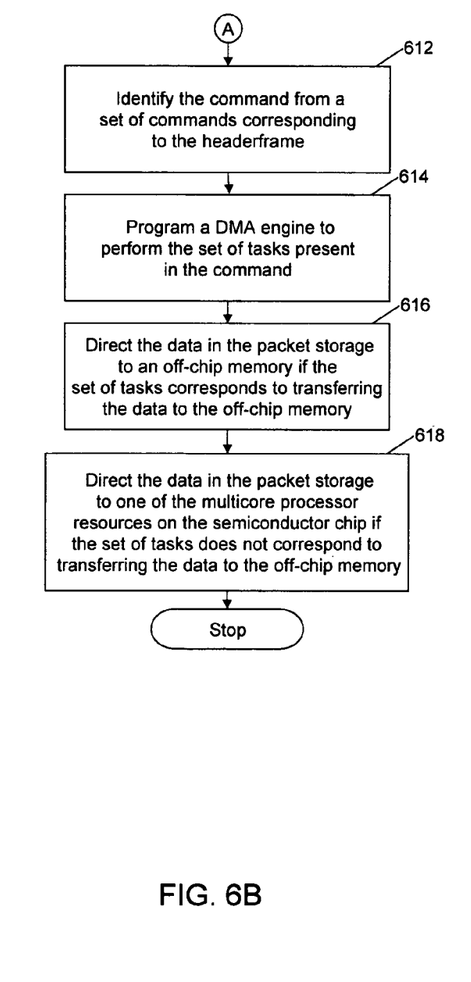

FIGS. 6A and 6B illustrate a flow diagram of a method for managing I/O interfaces 102 with the array of multicore processor resources 108 in semiconductor chip 100, in accordance with another embodiment of the present invention. I/O interface 102*a* packetizes data, based on an I/O protocol, to form a dataframe. The dataframe includes a header and the data. At step 602, the dataframe is received by I/O shim 106*d* from I/O interface 102*a*. As mentioned earlier, the transfer rate of receiving the dataframe is controlled by transfer-rate controlling module 204 when the dataframes are received. At step 604, an I/O protocol, corresponding to the received dataframe, is identified by identifying module 210. The identified I/O protocol includes the information pertaining to the header and data parts of the dataframe. At step 606, the header and the data present in the dataframe are identified, based on the identified I/O protocol information. At step 608, the header is packetized to form a headerframe by header-processing module 302. The headerframe includes information relating to the address of processor resource 108*a* that is selected from the array of multicore processor resources 108. As mentioned earlier, the array of multicore processor resources 108 are processor resources that are programmed to execute a required set of tasks and are available for service.

Subsequently, the headerframe is sent by sending module 304 to processor resource 108*a* at step 610, to process the headerframe, and to identify a command corresponding to the headerframe. An arbitrator multiplexer 220, present in IO shim 106*d* routes the headerframe to processor resource 108*a*. Processor resource 108*a* checks for the framing errors and sends an acknowledgement bit for receipt of the headerframe. Arbitrator multiplexer 220 receives the acknowledgment bit and thereby confirms receipt of the headerframe from processor resource 108*a*. At step 612, processor resource 108*a* identifies a command corresponding to the headerframe in command log 310, which includes a log of commands corresponding to different headerframes. Subsequently, a directive command, issued by processor resource 108*a*, selects the set of tasks corresponding to the identified command present in command log 310. At step 614, DMA engine 402 is programmed by processor resource 108*a* to execute the selected set of tasks corresponding to the identified command. As mentioned earlier, DMA engine 402 uses data handler 404 to perform certain data manipulations such as pre-pending the data, post-pending the data, and the like. At step 616, DMA engine 402 directs the data in the packet storage to off-chip memory 104 through MDN lines 214, if the set of tasks in the command corresponds to transferring the data to off-chip memory 104. Alternatively, DMA engine 402 directs the data in the packet storage to one or more processor resources in the array of multicore processor resources 108 on the semiconductor chip 100 through IODN lines 216 at step 618, if the set of tasks does not correspond to transferring the data to off-chip memory 104. A selection of the one or more of processor resources is performed based on the set of tasks identified by processor resource 108*a* in the command. The number of processor resources needed for performing the set of tasks also depends on the identified command. In addition, processor resource 108*b* can process the data present in the packet storage if required by the set of tasks identified in the command.

Figure 7:
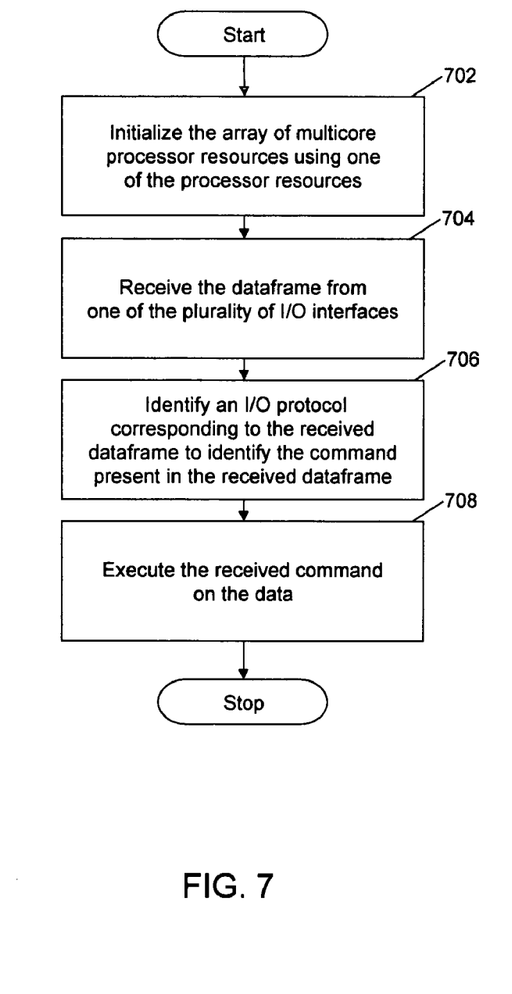
FIG. 7 illustrates a flow diagram of a method for managing I/O interfaces with an array of multicore processor resources in the semiconductor chip in accordance with another embodiment of the present invention.

FIG. 7 illustrates a flow diagram of a method for managing I/O interfaces 102 with an array of multicore processor resources 108 in the semiconductor chip 100, in accordance with yet another embodiment of the present invention. At step 702, a processor resource from the array of multicore processor resources 108 initializes other processor resources in the array of multicore processor resources 108. This includes programming each of the array of multicore processor resources 108 to execute a certain set of tasks. In accordance with another embodiment of the present invention, an off-chip processor 218, connected to semiconductor chip 100, initializes the array of multicore processor resources 108. The initialization process is performed based on a multi-level boot sequence. The initialization process starts by asserting the reset pin of semiconductor chip 100. The on-chip state machines manage the phase lock loop (PLL) initialization and provide internal logic reset. In level-0 of the multi-level boot sequence, an instruction stream built into each processor resource wakes up and waits for command from its static network ports. The strapping pins indicate to semiconductor chip 100 the port address from which the data is transferred into semiconductor chip 100. This data is transferred to one of I/O shims 106a-d. Subsequently, the one of the I/O shims 106a-d sends a dataframe, formed from the data to one of processor resources 108 through the static network. This processor resource, including a level-0 boot code, is programmed by one of the I/O shims 106a-d to interpret the information in the dataframe. The information includes an address where the data is to be stored. Subsequently, the processor resource, with a level-0 boot code, programs the rest of processor resource 108 in serial fashion. I/O shims 106a-d information is fed to a controlling processor that initiates the configuration of each I/O interface 102 by writing memory registers in I/O shims 106a-d. The writing of the memory registers is performed by transferring digital information related to each I/O interface 102 to the memory registers. I/O interface 102a packetizes the data to form a dataframe. The dataframe includes a header and the data. At step 704, a dataframe is received by I/O shim 106d from I/O interface 102a. At step 706, the I/O protocol corresponding to the received dataframe is identified by I/O shim 106d. Subsequently, the header and the data present in the dataframe are identified by I/O shim 106d, using the identified I/O protocol. The command corresponding to the header in the dataframe is detected by processor resource 108a, which is capable of executing the required set of tasks. Such a processor resource is selected from the array of multicore processor resources 108 based on the capability and availability of the processor resource. These processor resources are also searched for their availability to execute the required set of tasks on the data corresponding to the command. At step 708, the set of tasks is executed on the data present in the dataframe by I/O shim 106d if the set of tasks does not require involvement of the array of multicore processor resource 108.

Figure 8:
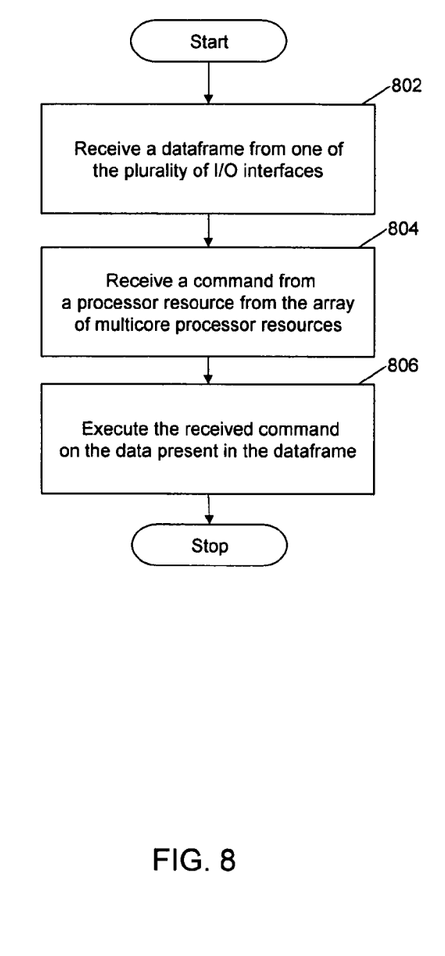
FIG. 8 illustrates a flow diagram of a method for managing I/O interfaces with an array of multicore processor resources in the semiconductor chip in accordance with yet another embodiment of the present invention.

FIG. 8 illustrates a flow diagram of a method for managing I/O interfaces 102 with an array of multicore processor resources 108 in the semiconductor chip 100, in accordance with yet another embodiment of the present invention. I/O interface 102a packetizes data, based on an I/O protocol, to form a dataframe. The dataframe includes a header and the data. At step 802, the dataframe is received by I/O shim 106d from I/O interface 102a. At step 804, a command is received by I/O shim 106d from processor resource 108a. The command includes a set of tasks that is to be executed on the data present in the dataframe. At step 806, the set of tasks is executed on the data present in the dataframe by DMA engine 402, which is programmed by processor resource 108a to execute the set of tasks corresponding to the command.

Various embodiments of the present invention provide a dynamic interface, an I/O shim between I/O interfaces, and an array of multicore processor resources. An I/O shim is a chip area-efficient hardware that is controlled by software. It handles I/O interfaces by using different usage models, which include steps such as sending the data directly to the memory shim through MDN lines, and sending the data directly to one of the array of multicore processor resources 108 through IODN lines or from one I/O interface to another I/O interface.

Additionally, the I/O shim is dynamically assigned to one or more of the processor resources and to a particular I/O interface, based on the capabilities and availabilities of the array of multicore processor resources. This eliminates predetermined binding of the assigned processor resource to the I/O interface and provides flexibility to the I/O shim.

Further, the I/O shim dynamically decides the number of I/O processor resources needed for an I/O interface, depending on the set of tasks to be performed on the data. Further, the software component of the I/O shim strings together the processor resources and the I/O interfaces in any desired combination.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system typically comprises a computer, an input device, a display unit and the Internet. The computer typically comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions on the computer system.

The computer system executes a set of instructions that are stored in one or more storage elements to process input data. The storage elements may also hold data or other information, as desired, and may be an information source or physical memory element present in the processing machine.

The set of instructions may include various commands that instruct the processing machine to execute specific tasks such as the steps constituting the method of the present invention. The set of instructions may be in the form of a software program. The software may be in various forms such as system software or application software. Further, the software might be in the form of a collection of separate programs, a program module with a larger program, or a portion of a program module. The software might also include modular programming in the form of object-oriented programming. Processing of input data by the processing machine may be in response to user commands, to the results of previous processing, or to a request made by another processing machine.

While the embodiments of the invention have been discussed and described, the invention is not limited to these embodiments only. A number of changes and modifications can be thought of without moving away from the scope of the invention, as discussed in the claims.

What is claimed is:

1. A method for managing a plurality of I/O interfaces with an array of multicore processor resources in a semiconductor chip, wherein the plurality of I/O interfaces use at least one I/O protocol, the method comprising:
  a. receiving a data frame from one of the plurality of I/O interfaces, wherein the data frame includes a header and data, the data frame being received by at least one of a plurality of I/O shims dynamically programmed for interfacing the one of the plurality of I/O interfaces with the array of multicore processor resources;
  b. identifying an I/O protocol corresponding to the received data frame by the at least one of the plurality of I/O shims receiving the data frame, wherein the I/O shim has the ability to handle the identified I/O protocol-specific data corresponding to the received data frame;
  c. identifying a command present in the received data frame by the I/O shim based on the identified I/O protocol, wherein the command includes a set of tasks to be executed on the data; and
  d. executing the identified command on the data by processor resources present in the array of multicore processor resources, wherein the processor resources are dynamically programmable.

2. The method of claim 1, wherein the data frame is a custom packet.

3. The method of claim 1, wherein receiving the data frame from the one of the plurality of I/O interfaces comprises controlling a transfer-rate of receiving the data frame, the transfer-rate being controlled by the I/O shim receiving the data frame.

4. The method of claim 1, wherein identifying the command present in the received data frame comprises:
  a. identifying the header and the data present in the data frame$_{13}$ based on the identified I/O protocol, wherein the header in the data frame can be manipulated dynamically by the I/O shim based on a computational requirement;
  b. packetizing the header to form a header frame, wherein the header frame includes information regarding an address of one of the multicore processor resources, wherein the one of the multicore processor resources can be selected dynamically based on its capability and availability for executing the set of tasks;
  c. sending the header frame to the one of the multicore processor resources, wherein the multicore processor resources can be programmed dynamically to identify the command corresponding to the header frame; and
  d. identifying the command from a set of commands corresponding to the header frame, wherein the command is identified by the one of the multicore processor resources.

5. The method of claim 4, wherein the header includes a Quality of Service (QOS) indicator, information regarding a data structure of the header and the data, and a location information of the header and the data.

6. The method of claim 1, wherein identifying the command present in the received data frame further comprises:
  a. storing the header in a header storage using a data structure information of the header and a location information of the header; and
  b. storing the data in a packet storage using a data structure information of the data and a location information of the data.

7. The method of claim 4, wherein packetizing the header to form the header frame comprises receiving a directive command from the one of the multicore processor resources, wherein the directive command includes information regarding packetizing of the header to form the header frame in order to execute the set of tasks.

8. The method of claim 1, wherein executing the identified command on the data comprises:
  a. programming a Direct Media Access (DMA) engine to execute the set of tasks present in the command, the DMA engine being programmed by one of the processor resources present m the array of multicore processor resources based on the set of tasks to be executed;
  b. directing the data in the packet storage to an off-chip memory if the set of tasks corresponds to transferring the data to the off-chip memory, wherein the off-chip memory is a memory chip connected outside the semiconductor chip; and
  c. directing the data in the packet storage to the one of the multicore processor resources on the semiconductor chip if the set of tasks does not correspond to transferring the data to the off-chip memory.

9. The method of claim 8, wherein directing the data in the packet storage to the off-chip memory comprises manipulating the data based on the set of tasks present in the command by using one of pre-pending and post-pending processes.

10. The method of claim 8, wherein directing the data in the packet storage to the one of the multicore processor resources on the semiconductor chip comprises manipulating the data based on the set of tasks present in the command by using one of pre-pending and post-pending processes.

11. A method for managing a plurality of I/O interfaces with an array of multicore processor resources m a semiconductor chip, wherein the plurality of I/O interfaces use at least one I/O protocol, the method comprising:
  a. initializing the array of multicore processor resources using one of the multicore processor resources, the array of multicore processor resources being programmable to identify a command present in a data frame, wherein initializing the array of multicore processor resources comprises programming the multicore processor resources present in the array of multicore processor resources to execute a set of tasks present in the command;
  b. receiving the data frame from one of the plurality of I/O interfaces, wherein the data frame includes a header and data;
  c. identifying an I/O protocol corresponding to the received data frame to identify the command present in the received data frame, wherein the command includes the set of tasks to be executed on the data; and
  d. executing the identified command on the data.

12. The method of claim 11, wherein initializing the array of multicore processor resources is performed based on a multi-level boot sequence.

13. A method for managing a plurality of I/O interfaces with an array of multicore processor resources m a semiconductor chip, wherein the plurality of I/O interfaces use at least one I/O protocol, the method comprising:
  a. receiving a data frame from one of the plurality of I/O interfaces, wherein the data frame includes a header and data, the data frame being received by at least one of a plurality of I/O shims;
  b. receiving a command from a processor resource from the array of multicore processor resources, the command being received by the at least one of the plurality of I/O shims, wherein the command includes a set of tasks to be executed on the data present in the data frame; and
  c. executing the received command on the data.

14. An I/O shim for managing a plurality of I/O interfaces with an array of multicore processor resources in a semiconductor chip, wherein the plurality of I/O interfaces use at least one I/O protocol, the I/O shim comprising:

a. a media-access control layer, the media-access control layer receiving a data frame from one of the plurality of I/O interfaces, wherein the data frame includes a header and data;
b. a transfer-rate controlling module, the transfer-rate controlling module controlling a transfer-rate of receiving the data frame;
c. a generic-command identifying module, the generic-command identifying module identifying a command present in the received data frame and providing ability to handle identified I/O protocol-specific data corresponding to the received data frame, wherein the command includes a set of tasks to be executed on the data; and
d. an executing module, the executing module executing the identified command on the data.

15. The I/O shim according to claim 14, wherein the media-access control layer comprises an identifying module, the identifying module identifying the header and the data present in the data frame.

16. The I/O shim according to claim 14, wherein the media-access control layer is in a pass-all-packet mode in order to make the media-access control layer compatible with custom packets.

17. The I/O shim according to claim 14, wherein the generic-command identifying module comprises:
a. a header processing module, the header processing module packetizing the header to form a header frame, wherein the header frame includes information regarding an address of a processor resource that is dynamically selected from the array of multicore processor resources;
b. a header storage, the header storage storing the header;
c. a packet storage, the packet storage storing the data; and
d. a command log, the command log including a set of commands corresponding to different header frames, wherein the commands include a set of tasks.

18. The I/O shim according to claim 17, wherein the header processing module comprises a sending module, the sending module sending the header frame to one of the array of multicore processor resources, wherein the multicore processor resources can be programmed dynamically to identify the command corresponding to the header frame.

19. The I/O shim according to claim 14, wherein the executing module comprises:
a. a Direct Media Access (DMA) engine, the DMA engine capable of being programmed by a processor resource for executing the set of tasks in the command; and
b. a data handler, the data handler performing protocol-specific processing based on the identified command.

20. The I/O shim according to claim 19, wherein the data handler comprises a data manipulator, the data manipulator performing a data manipulation based on the identified command by pre-pending the data and by post-pending the data.

* * * * *